Dec. 6, 1938.  L. GIRARDIN  2,139,157
DEVICE FOR THE REPETITION OF SIGNALS ON A VEHICLE
Filed June 4, 1936
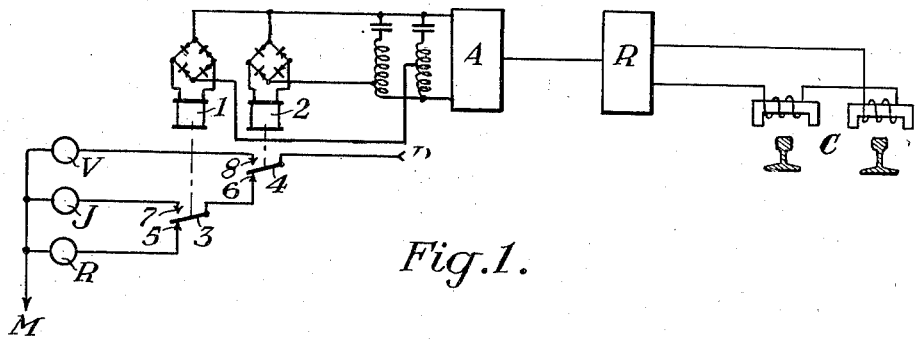
Fig.1.
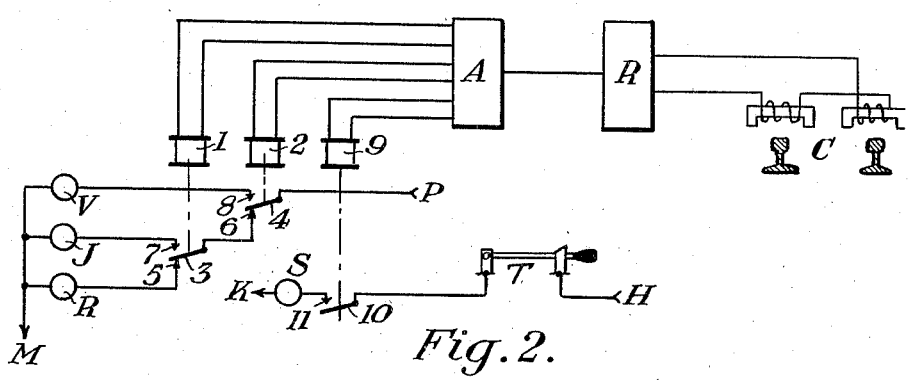
Fig.2.
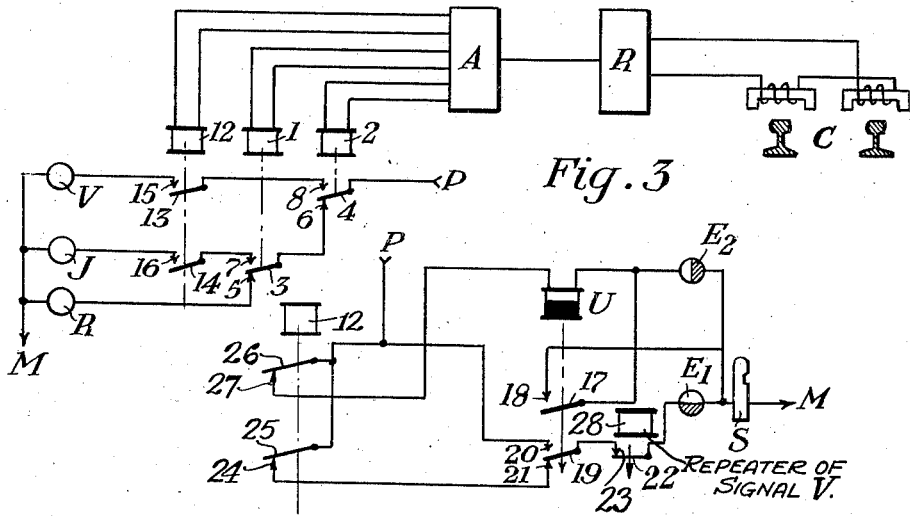
Fig.3.
Fig.4.
INVENTOR
Louis Girardin.
BY
HIS ATTORNEY Patented Dec. 6, 1938

2,139,157

UNITED STATES PATENT OFFICE 2,139,157

DEVICE FOR THE REPETITION OF SIGNALS ON A VEHICLE

Louis Girardin, Paris, France, assignor, by mesne assignments, to The Union Switch & Signal Company, Swissvale, Pa., a corporation of Pennsylvania Application June 4, 1936, Serial No. 83,469
In France January 6, 1936

9 Claims. (Cl. 246—63)

The present invention has for its object improvements in devices for the repetition of signals, particularly on locomotives or moving vehicles on railways.

Various repeating devices are known and these may be arranged in two main classes:

Repeating devices with permanent control of the indication of the signals or the state of the track in advance.

Repeating devices with transient control of the indication.

The first of these classes provides the maximum guarantee of safety for the vehicles and the invention will be described in relation to this class.

The invention is particularly applicable to repeating devices for signals on a movable object such as a train, automobile, aeroplane or boat controlled by a circuit which carries an electric signalling current, especially alternating or continuously pulsating current modulated at various frequencies. The modulation frequencies may be as low as 1 to 4 cycles per second, for example.

The devices according to the present invention provide the following advantages:

They provide a greater number of indications than hitherto obtained.

They provide supplementary or special indications simultaneously with the normal indications.

They provide for registering all the indications given.

The invention comprises superposing in the signalling circuit several modulations in such a way that by combining these the apparatus will be capable of transmitting a greater number of indications. For this purpose there is superposed upon a first group of modulations which are characterized by variations in the carrier current in accordance with frequencies distributed in a certain band, a second group of modulations characterized for example by interruptions of the said carrier current in accordance with certain lower frequencies. The apparatus comprises a receiver on the vehicle which transforms the signalling current into controlling current in well-known manner, and also comprises decoding and selecting devices for the first group of frequencies as well as decoding apparatus for the second group. In order to prevent the interruptions of current which characterize the modulations of the second group from interfering with the operation of the selecting apparatus for frequencies of the first group, the duration of these interruptions is made fairly short and there is imparted to the latter apparatus an inertia or time constant of sufficiently long duration to make it insensitive to these interruptions. If desired, the apparatus can be arranged to provide supplementary indications by means of sound, for example, if the indication normally given is visual, or it can be used to provide any other suitable operation which can be interrupted at will, if desired.

The annexed drawing represents diagrammatically and merely by way of example, different forms of apparatus embodying my invention, which apparatus as here shown is intended to be used on a vehicle, preferably a vehicle running on a railway.

Figure 1 is a diagrammatic view showing usual and well-known apparatus for providing three indications on the vehicle.

Figure 2 is a diagrammatic view showing the invention applied to the apparatus of Figure 1.

Figure 3 is a diagrammatic view showing a modification of Figure 2 for providing different indications and also embodying my invention.

Figure 4 is a diagrammatic view showing a preferred method of combining the indications furnished by the apparatus of Figure 3 with an electric whistle control.

Figure 1 is a diagram in which is shown, for the purpose of more clearly defining the nature of the invention, a well-known three indication system in which the most restrictive indication R is obtained by the absence of signalling current. The less restrictive indication J is controlled by the relay 1 which is responsive, for example, to a modulation of the signalling current at a frequency $f_1$. The least restrictive indication V is controlled by the relay 2 which is responsive, for example, to a modulation at a frequency $f_2$. The positive and negative terminals of the source of supply for the indicating apparatus are designated respectively P and M. In order to aid understanding of the diagram, there are shown in Figure 1 the signalling circuit C, the receiver device R and the amplifier A, the construction and operation of which are well known and need not be described in detail.

The operation of the apparatus of Figure 1 is as follows:

In the absence either of modulation or of any current in the circuit C, the contacts 3 and 4 controlled respectively by the frequency selective relays 1 and 2 responsive to the frequencies of the first group are in contact with the back points 5 and 6 since relays 1 and 2 are deenergized, thus lighting signal R. When there appears in the circuit C the modulation $f_1$, the relay 1 causes front contact 3—7 to close and since relay 2 is deenergized, signal J is lighted. If the modulation $f_2$ is effective, the relay 1 is no longer actuated, again effecting the connection 3—5, and since relay 2 establishes contact between 4 and 8, signal V only is illuminated.

Referring to the apparatus of Figure 2, there is superposed on the first group of modulations $f_1 f_2$ in the circuit C a second group of slower frequencies, such as $g_1$ to which a relay 9 is responsive, the time constants of relays 1 and 2 being such as to render these relays insensitive to frequency $g_1$. The means for obtaining these time constants can be of any desired kind. For example, any of the well-known means for retarding or accelerating the relays such as: magnetic shunts, resistances, capacities, short-circuited windings, differential windings, and core air gaps may be used. It is also possible to use, in place of relays, magnetic saturation devices, motor operating contactors, electron emission devices electrically controlled, apparatus controlled by the flow of fluid, or their equivalent.

The relay 9 shown in the diagram controls a sound indicator S, the indications V, J and R being visual signals. If desired, the supply of current from source H—K for indicator S may be cut off by the operation of suitable contact apparatus T. The sound indicator may be replaced or supplemented by a device for the control of a brake or accelerator, not shown. If desired, the sound indication or operation of the supplementary equipment may also be registered by any suitable and well-known means.

In connection with the operation described for Figure 2, it should be noted that, for purposes of illustration only, the maximum duration of the characteristic interruptions $g_1$ is preferably fixed at seven tenths of a second every two seconds if the time constant referred to above is one second; this constant being determined under conditions of operation with two modulations in the circuit C. If, at the time when the modulation $f_1$ is operative, the modulation $g_1$ is superposed therein, the signal J of Figure 2 will be kept energized as before described, and in addition, S will give a sound indication at each interruption at frequency $g_1$ by means of a circuit including the interrupter 10, the contact 11, the switch T, and the source H—K. In a similar manner the signal V will be given in combination with S when the modulations $f_2$ and $g_1$ are effective simultaneously.

Figure 3 shows the diagram of an arrangement which is particularly suitable for combining the indications resulting from the frequencies $f_1$ and $f_2$ on the one hand and $g_1$ on the other hand. For this purpose there are interposed in the circuits of the two light signals controlled by the relays 1 and 2 the contact fingers 13 and 14 which follow the modulations of the second group. These fingers are controlled, for example, by a suitable relay 12 designed in such a manner that for fairly high frequencies of the first group the fingers 13 and 14 are in a horizontal position, engaging with 15 and 16, while for the frequencies of the second group the reverse action takes place, whereupon this double operation may be utilized to produce beats. The relay 12 is constructed for this purpose with a time constant between $$\frac{1}{2(g_1)} \text{ and } \frac{1}{2(f_1)} \frac{1}{2(f_2)}$$

by means of one or more of the methods referred to above.

When the modulation $f_1$ is effective, current is supplied to signal J over the circuit P, 4, 6, 3, 7, 14, 16, J, and M. When frequency $g_1$ is present the relay 1 will not follow this frequency, thus leaving 3 in contact with 7, but since 14 follows the impulses in relay 12, it causes the blinking of signal J. Similarly, if the modulation $f_2$ is effective, signal V is supplied by the circuit P, 4, 8, 13, 15, V, and M. If frequency $g_1$ is present, relay 2 will not follow this frequency but finger 13 will leave 15 at the frequency of the interruptions characterizing, $g_1$, thus causing V to blink at this frequency. The indication R will always be given in the absence of modulation in C, through the circuit P, 4, 6, 3, 5, R, M.

Similarly, luminous gas lamps or tubes, the circuits of which are controlled by modulations of the first group, may be controlled by a pulsating current supplied at modulation frequency of the second group, by a branched connection from a suitable circuit of the amplifier. If, in such apparatus the time lag of the lamp filaments or the dielectric cohesion of the gas lies between $$\frac{1}{2(g_1)} \text{ and } \frac{1}{2(f_1)}, \frac{1}{2(f_2)}$$

the lamps or tubes will blink when the circuit C is modulated according to frequencies $g_1$ and $f_1$ or $f_2$, remaining constantly illumined if a frequency such as $g_1$ is not present.

Figure 4 represents a preferred form of apparatus for combining an electric control for a whistle with the indication apparatus of Figure 3, taking into consideration certain signalling requirements on railways.

In this figure, P and M are the terminals of an electric generator. S is a whistle connected, for example, with a fluid pressure pipe and an electric valve, not shown, and arranged so that the said whistle operates when current is cut off. E is a contactor having several contact segments controlled by a handle which contactor serves to register signals when the whistle is cut off by manual control. U is a retarded relay which controls the re-setting of the whistle and maintains it in a normal condition by means of contact fingers 19, 17 and contacts 18, 20 and 21. The contact finger 22 and its contact 23 may be controlled by a suitable intermediate device 28 which can be connected with or controlled by, for example, the circuits of the signals of Figure 3. Device 28 is sufficiently slow releasing to bridge the periodic interruption of its control circuit. As shown in the drawing, device 28 is a relay which is controlled by the circuit for signal V. Contact fingers 25 and 26 are controlled by the relay 12 for closing or opening contacts 24 and 27.

The operation of the device is as follows: The whistle is kept normally inoperative by the circuit P, 25, 24, 21, 19, 23, 22, E1, S, M. When the signal on the vehicle changes to a more restrictive indication, the whistle operates by the opening of 25 or 22, and will only be stopped by the action of the driver in manipulating E2, E1, for a period greater than the time constant of the device effecting the cut off of current to the whistle.

The circuit thus established by manipulating the contactor will follow the following path: P, 26, 27, U, E2, S, M, thus causing the energization of relay U which will prepare the circuit for re-setting the whistle through P, 20, 19, 23. It should be noted that the relay U will now be maintained energized, even during the opening of contact 27, owing to its considerable release retardation, and that the apparatus described will in no way interfere with the control and stopping of the whistle by an interrupter, such as 22. The whistle will sound at the frequency of operation of contacts 25 or 26, so long as the driver does not operate E1 or E2. The combination of apparatus shown in Figures 3 and 4 thus permits obtaining special indications, such as might be desirable, for instance, when working yards are entered.

It is obvious that there are numerous other circuits controlled by relays such as 1, 2, etc., and responsive to frequencies $f_1$, $f_2$ which may be combined with relays such as 9, 12, etc., responsive to frequencies such as $g_1$, etc., for obtaining the useful result to which my invention is directed.

It is also obvious that the apparatus described and illustrated may be amplified and modified within the scope of the appended claims without departing from the spirit and scope of the invention. For example, it could be supplemented by apparatus controlled electrically, mechanically, or otherwise, and acting, if desired, on the braking mechanism of the vehicle.

Having thus described my invention what I claim is:

1. In combination, a first relay selectively operated to an energized position in response to current modulated at a first frequency, a signal, means controlled by said first relay for causing said signal to provide a substantially constant indication, a second relay responsive to current modulated at a second frequency which is lower than said first frequency, said second relay being timed to follow the modulations at said second frequency, and means controlled by said second relay for imposing a periodic variation on the indication provided by said signal.

2. In combination, a first relay selectively operated to an energized position in response to current varied at a first rate, a signal, a circuit controlled by said first relay for energizing said signal to provide a substantially constant indication, a second relay responsive to current varied at a second rate and timed to follow the variations thereof, and means controlled by said second relay for periodically interrupting said circuit to impose a pulsating characteristic on the indication provided by said signal.

3. In combination, a first relay selectively operated to an energized position in response to current varied at a first rate, a visual signal, means controlled by said first relay for causing said signal to provide a substantially constant indication, a second relay responsive to current varied at a second rate and timed to follow the variations thereof, means controlled by said second relay for imposing a periodic variation on the indication provided by said signal, an audible signal, and other means controlled by said second relay for periodically sounding said audible signal to supplement the indication provided by said visual signal.

4. In combination, a first relay selectively responsive to current varied at a first rate, a signal, means controlled by said first relay for causing said signal to provide a substantially constant indication, a second relay responsive to current varied at a second rate and timed to follow the variations thereof, means controlled by said second relay for imposing a periodic variation on the indication provided by said signal, an auxiliary signal controlled by said second relay for supplementing the indication provided by the first signal, and manually controlled means for suppressing the indication of said auxiliary signal.

5. In combination, a first relay selectively operated to an energized position in response to current varied at a first rate, a second relay also operated to an energized position by current varied at said first rate but timed so as to follow variations of current occurring at a second rate which is slower than said first rate, a signal, and a circuit controlled by both said relays and effective for causing said signal to provide a substantially constant indication when the current is varied at said first rate, said circuit including a contact of said second relay for imposing a periodic variation on the indication provided by said signal when the current received by said relays comprises variations at both said first and said second rate.

6. In combination, a first and a second relay selectively operated to an energized position in response to current varied at a first and a second rate respectively, a first and a second signal controlled by said first and second relays respectively and providing a substantially constant indication when the associated relay is energized, a third relay responsive to current varied at a third rate and timed to follow the variations thereof, and means controlled by said third relay for imposing a periodic variation on the indication provided by said first or said second signal respectively according as said first and third or said second and third rates of current variation are effective simultaneously.

7. In combination, a first relay selectively responsive to current varied at a first rate, a signal, means controlled by said first relay for causing said signal to provide a substantially constant indication, a second relay responsive to current varied at a second rate and timed to follow the variations thereof, means controlled by said second relay for imposing a periodic variation on the indication provided by said signal, an auxiliary signal controlled by said second relay for supplementing the indication provided by the first signal, an acknowledging relay controlled by said second relay, and means including said acknowledging relay for suppressing the indication of said auxiliary signal.

8. In combination, a first relay selectively responsive to current varied at a first rate, a signal, means controlled by said first relay for causing said signal to provide a substantially constant indication, a second relay responsive to current varied at a second rate and timed to follow the variations thereof, means controlled by said second relay for imposing a periodic variation on the indication provided by said signal, an auxiliary signal controlled by said second relay for supplementing the indication provided by the first signal, an acknowledging relay, manually controlled means for energizing said acknowledging relay, and means effective when said acknowledging relay is energized for suppressing the indication of said auxiliary signal.

9. In combination, a first relay selectively responsive to current varied at a first rate, a signal, means controlled by said first relay for causing said signal to provide a substantially constant indication, a second relay responsive to current varied at a second rate and timed to follow the variations thereof, means controlled by said second relay for imposing a periodic variation on the indication provided by said signal, an auxiliary signal controlled by said second relay for supplementing the indication provided by the first signal, an acknowledging relay, a manually controlled contact, a pick-up circuit for said acknowledging relay including a contact of said second relay and said manually controlled contact, a holding circuit for said acknowledging relay, and means effective when said acknowledging relay is picked up for suppressing the indication of said auxiliary signal.

LOUIS GIRARDIN.